(12) United States Patent
Fujii et al.

(10) Patent No.: US 8,249,404 B2
(45) Date of Patent: Aug. 21, 2012

(54) POLYMER OPTICAL WAVEGUIDE AND METHOD OF PRODUCING THE SAME

(75) Inventors: Akira Fujii, Kanagawa (JP); Toshihiko Suzuki, Kanagawa (JP); Keishi Shimizu, Kanagawa (JP); Shigemi Ohtsu, Kanagawa (JP); Kazutoshi Yatsuda, Kanagawa (JP); Masahiro Igusa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 127 days.

(21) Appl. No.: 12/392,775

(22) Filed: Feb. 25, 2009

(65) Prior Publication Data
US 2010/0074579 A1 Mar. 25, 2010

(30) Foreign Application Priority Data

Sep. 25, 2008 (JP) ................................. 2008-246821

(51) Int. Cl.
*G02B 6/26* (2006.01)
*G02B 6/10* (2006.01)
*G02B 6/12* (2006.01)

(52) U.S. Cl. ............................. 385/31; 385/129; 385/14
(58) Field of Classification Search .................. None
See application file for complete search history.

(56) References Cited

U.S. PATENT DOCUMENTS

| 5,999,670 A | 12/1999 | Yoshimura et al. | |
| 2006/0002651 A1* | 1/2006 | Shimizu et al. | 385/14 |
| 2009/0046978 A1* | 2/2009 | Yasuda et al. | 385/31 |
| 2012/0002915 A1* | 1/2012 | Shiraishi | 385/14 |

FOREIGN PATENT DOCUMENTS

| JP | A-10-300961 | 11/1998 |
| JP | A-2004-226941 | 8/2004 |

* cited by examiner

*Primary Examiner* — Sarah Hahm
(74) *Attorney, Agent, or Firm* — Oliff & Berridge, PLC

(57) ABSTRACT

A polymer optical waveguide includes: a core; and a cladding enclosing the core and extending along a direction of light propagation, the polymer optical waveguide having a substantially rectangular parallelepiped shape, and the polymer optical waveguide having, at least at a position near one end thereof in a longitudinal direction, a groove that has a surface inclined at an angle of 45° with respect to the light propagation direction which reflects light propagating through the core so as to change the light propagation direction by 90°.

11 Claims, 5 Drawing Sheets

POLYMER OPTICAL WAVEGUIDE AND METHOD OF PRODUCING THE SAME

CROSS-REFERENCE TO RELATED APPLICATION

This application is based on and claims priority under 35 USC 119 from Japanese Patent Application No. 2008-246821 filed on Sep. 25, 2008.

BACKGROUND

1. Technical Field

The present invention relates to a polymer optical waveguide and a method of producing the same.

2. Related Art

Optical waveguides using polymer materials (polymer optical waveguides) have been developed as a means for optically transmitting signals within or between devices such as personal computers and mobile phones.

Optical waveguides are basically configured by a core through which light travels and a cladding enclosing the core and having a lower refractive index than that of the core. The following techniques, for example, for producing a polymer optical waveguide have been proposed.

(1) A method including impregnating a film with a monomer, selectively exposing a core portion to light so as to change the refractive index at the core portion, and adhering additional films to the film (selective polymerization method).

(2) A method including forming a core layer and cladding layers by coating, and forming a cladding by reactive ion etching (reactive ion etching (RIE) method).

(3) A method using photolithography in which a UV-curable resin obtained by adding a photosensitive material to a polymer material is exposed to light and developed (direct exposure method).

(4) A method using injection molding, (5) A method including forming a core layer and cladding layers by coating and exposing a core to change the refractive index of the core (photobleaching method).

(6) A method of producing a polymer waveguide using a mold.

When a polymer optical waveguide and a planar light-emitting device or planar light-receiving device (hereinafter referred to as a light-emitting/receiving, device), such as a surface-emitting laser (e.g., a vertical cavity surface emitting laser (VCSEL) or a semiconductor photodiode), are combined to form a waveguide-type optical module, it is a common practice to form a reflective surface at its end.

SUMMARY

According to an aspect of the invention, there is provided a polymer optical waveguide including:

a core; and a cladding enclosing the core and extending along a direction of light propagation, the polymer optical waveguide having a substantially rectangular parallelepiped shape, and the polymer optical waveguide having, at least at a position near one end thereof in a longitudinal direction, a groove that has a surface inclined at an angle of 45° with respect to the light propagation direction which reflects light propagating through the core so as to change the light propagation direction by 90°.

BRIEF DESCRIPTION OF THE DRAWINGS

Exemplary embodiments of the present invention will be described in detail based on the following figures, wherein.

DETAILED DESCRIPTION

Figure 1A:
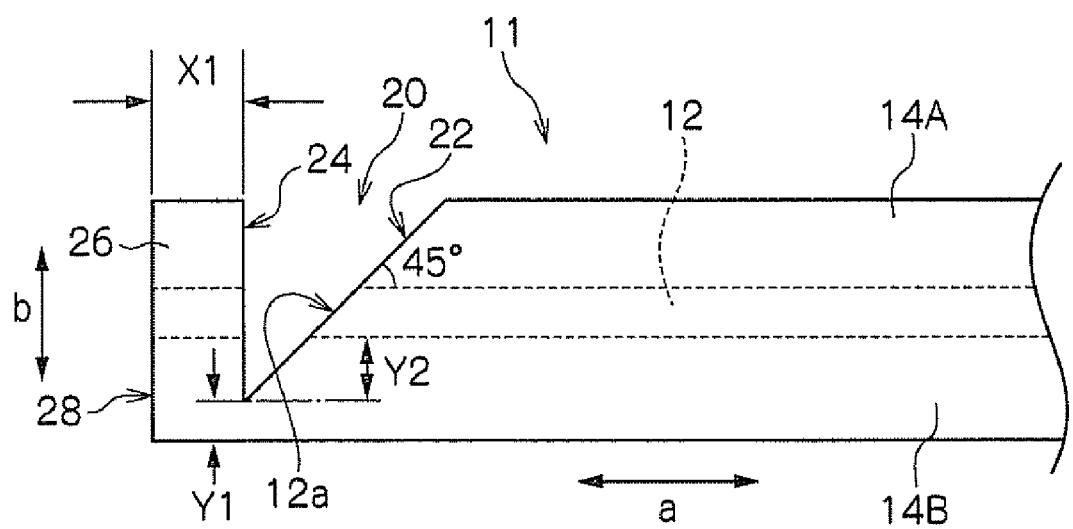
FIG. 1A is a schematic side view illustrating a structure of a polymer optical waveguide according to a first exemplary embodiment.

Exemplary embodiments of the present invention are described below with reference to the attached drawings. Elements having substantially the same function and action are denoted by the same reference numeral throughout the drawings or the indication of the reference numeral may be omitted, and duplicated descriptions are sometimes omitted.

First Exemplary Embodiment

Figure 1B:
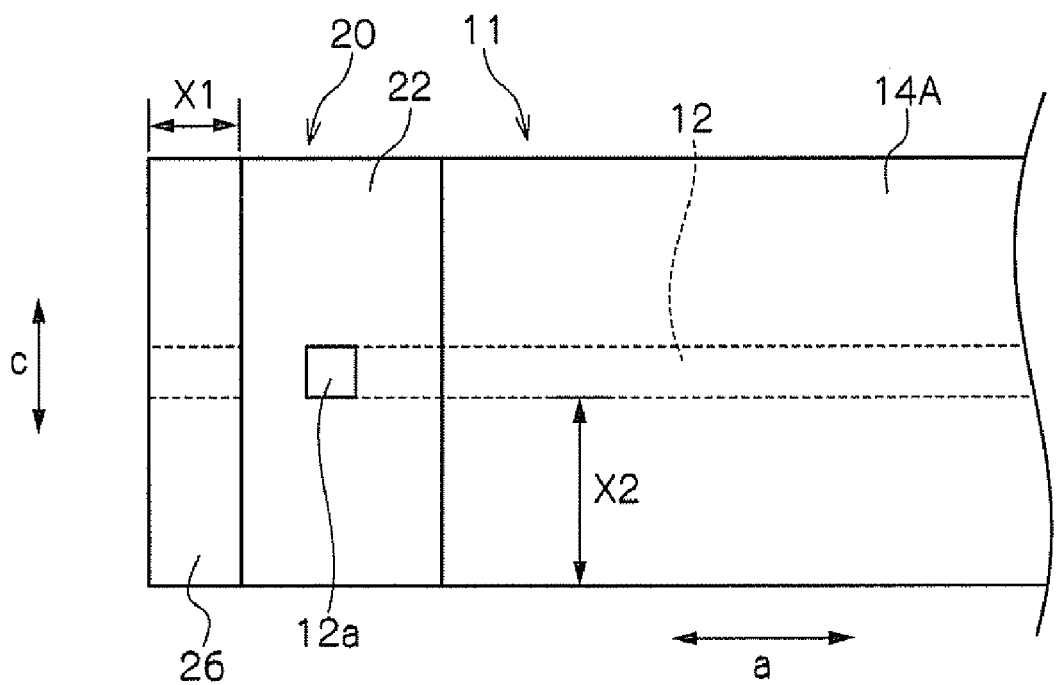
FIG. 1B is a top view of the structure.

FIG. 1A is a side view schematically illustrating a structure of a polymer optical waveguide according to a first exemplary embodiment, and FIG. 1B is a top view thereof.

Polymer optical waveguide 11 according to the present exemplary embodiment has a waveguide core 12 (hereinafter simply referred to as "core" in some cases) through which light travels and a cladding (upper cladding 14A and lower cladding 14B) having a lower refractive index than that of core 12 and enclosing the core along the direction of light propagation (i.e., extending along the direction of light propagation and enclosing the core). Polymer optical waveguide 11 has a film shape (or is shaped like a sheet). In other words, polymer optical waveguide 11 has substantially planar surfaces including an upper surface and a lower surface, and the upper surface is referred to as a "principal surface" of the optical waveguide. Groove 20 is formed near an end (in the longitudinal direction) of optical waveguide 11, so as to extend through upper cladding 14A, core 12, and a part of lower cladding 14B. Upper cladding means a region including both a cladding portion located at both sides of the core in the horizontal direction and a cladding portion located at the upper side of the core when viewed from the direction perpendicular to a surface of the polymer optical waveguide that is not a principal surface. In other words, FIG. 1A shows a surface of polymer optical waveguide 11 that is not a principal surface, and FIG. 1B shows the upper surface (a principal surface). A surface of groove 20 at the waveguide core 12 side (or a side surface of groove 20 at the center side of the waveguide) forms inclined surface 22 at an angle of 45° with respect to the direction of light propagation "a", and inclined surface 22 extends along the length direction "c" of groove 20.

In polymer optical waveguide 11 having such a structure, propagation light inside a core 12 is reflected at an interface between 45°-inclined surface 22 of groove 20 and the air so as to change the direction by 90°. Protruding portion 26 located between end surface 28 of optical waveguide 11 and vertical surface 24 of groove 20 is disposed along length direction "c" of groove 20 so as to oppose inclined surface 22. At the bottom of groove 20, a part of lower cladding 14B is left. Therefore, for example, when a light-emitting/receiving device is attached to the lower surface of lower cladding 14B using an adhesive, protruding portion 26 disposed along groove 20 and a part of lower cladding 14B left at the bottom portion of groove 20 serve as a protecting wall for inclined surface 22, so that the adhesive is inhibited from flowing to inclined surface 22 and adhering to core portion 12a. As the result, reflection loss accompanying the optical-path deflection owing to the adhesive is suppressed.

Figure 2:
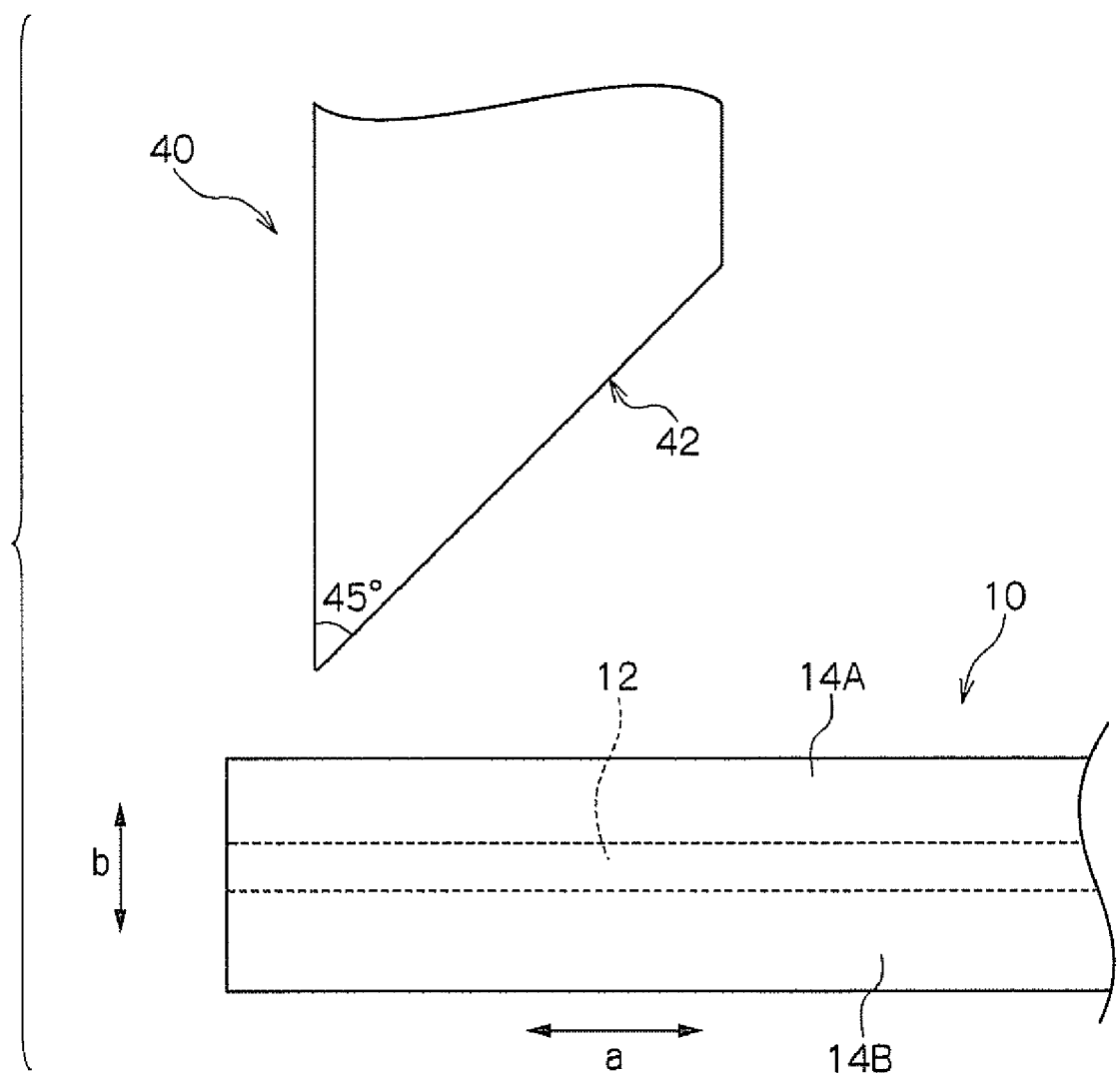
FIG. 2 is a diagram illustrating an example of a blade used for forming a 45°-inclined surface at a polymer film.

Next, a method of producing polymer optical waveguide 11 according to the first exemplary embodiment will be described. FIG. 2 illustrates a part of the process of producing polymer optical waveguide 11 according to the present exemplary embodiment.

(A) Preparation of Polymer Film Having Core and Cladding

Polymer film 10 is prepared which has core 12 and a cladding (upper cladding 14A and lower cladding 14B) surrounding core 12 and extending along the direction of light propagation. The method of preparing polymer film 10 is preferably a method using a silicone rubber mold (see JP-A No. 2004-226941) in view of simplifying the production and improving the performance of the produced waveguide. However, the method is not limited thereto, and may be selected from other conventional methods including, for example, the selective polymerization method, the RIE method, the direct exposure method, the injection molding method, the photobleaching method and the stamper method.

Regardless of what method is used, the refractive index of cladding portions 14A (upper cladding) and 14B (lower cladding) is made lower than that of core 12, so as to impart optical properties required for an optical waveguide. In order to ensure a sufficient difference in refractive index between the cladding and optical waveguide core 12, the relative index difference is preferably 0.5% or more, and more preferably 1% or more. The cladding (cladding portions 14A and 14B) may be formed by two or more materials such that the cladding is constituted by plural layers; in such a case, the difference in refractive index between the respective cladding portions (layers) is preferably smaller, and may be 0.05 or less, preferably 0.01 or less, and more preferably zero.

The materials for forming polymer film 10 are not particularly limited as long as a desired difference in refractive index between core 12 and cladding (cladding portions 14A and 14B) can be set. Examples of the materials include alicyclic olefin resins, acrylic resins, epoxy resins, and polyimide.

Production methods and materials may be selected from those described above, and may be used to produce, for example, a multimode polymer optical waveguide whose end surfaces are both rectangular, the multimode polymer optical waveguide having core 12 and cladding portions 14A and 14B enclosing core 12 and having a lower refractive index than that of core 12.

Formation of Groove Having 45°-Inclined Surface at End Portion of Waveguide

Thereafter, polymer film 10 is cut in the thickness direction with blade 40 having 45°-inclined surface 42 at the blade edge thereof.

For example, as shown in FIG. 2, a portion of polymer film 10 near an end thereof is cut in thickness direction "b" with 45°-inclined surface 42 at the blade edge facing the side (of groove 20) at which reflection surface 22 is to be formed (i.e., the side at which an optical path is located). At the time of cutting, a (so-called) half-cut is performed to leave a part of the thickness of lower cladding 14B; specifically, cutting is performed until the edge of blade 40 reaches a position that is lower than the bottom (lower surface) of core 12 but is above the bottom (lower surface) of polymer film 10. As a result of the half-cut, groove 20 having reflection surface 22 is formed and protruding portion 26 that inhibits adhesion of a contaminant to reflection surface 22 is also formed, wherein reflection surface forms an angle of 45° with respect to the direction "a" of the light propagating within the core when viewed from a side surface of polymer film 10.

Width X1 of protruding portion 26 as shown in FIGS. 1A and 1B may depend on, for example, the size of the light-emitting/receiving device connected to optical waveguide 11, the position of a light-emitting/receiving point of the device, and the position of a metal wire (connection code) provided at the device. In consideration of the strength of the waveguide, the ability to inhibit contamination, space saving, and the like, width X1 is preferably more than about 30 µm but not more than about 3,000 µm, and more preferably more than about 50 µm but not more than about 1,000 µm. From the viewpoint of space saving, in particular, groove 20 is preferably formed at a position that is separated from end surface 28 of optical waveguide 11 by a distance of about 500 µm or less.

Distance Y1 between the blade edge and the lower surface of the optical waveguide at the time of cutting, which is the thickness of a remaining portion of lower cladding 14B at the deepest groove portion of groove 20, is preferably about 5 µm or more, more preferably about 10 µm or more, and still more preferably about 20 µm or more, in consideration of the strength of the waveguide after cutting and the accuracy of positioning of blade 40 in the height direction.

Distance Y2 between the blade edge and the bottom of the core at the time of cutting is preferably about 5 µm or more, more preferably about 10 µm or more, and still more preferably about 20 µm or more, in consideration of the strength of waveguide 11 after cutting, accuracy of positioning of blade 40 in the height direction, and the possibility that the inclination angle of reflection surface 22 of core 12 may not be a desired angle if a slightly curved portion at the edge of blade 40, which is usually present, contributes to determining the shape of reflection surface 22.

Connecting Optical Waveguide and Light-Emitting/Receiving Device

Figure 6:
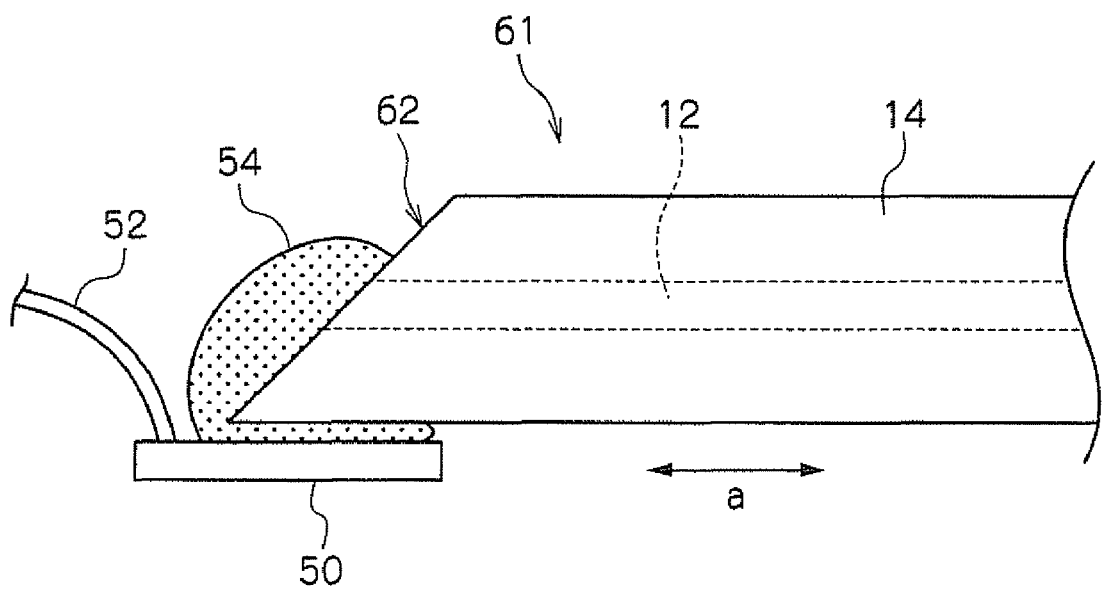
FIG. 6 is a schematic diagram illustrating a conventional polymer optical waveguide having an optical-path-deflecting reflection surface.

In general, an optical waveguide is connected, with an optical adhesive, to a light-emitting/receiving device such as a surface-emitting laser (e.g., VCSEL) or a semiconductor photodiode, and used. For the purpose of comparison, a configuration is shown in FIG. 6 in which light-emitting/receiving device 50 is connected, with adhesive 54, to conventional polymer optical waveguide 61 having an optical-path-deflecting reflective surface at an end of the waveguide. In optical waveguide 61 having 45°-inclined surface 62 as an end surface at which the direction of the propagated light is changed by 90°, without a metal mirror, by reflection at an interface between core 12 and the air, waveguide core 12 at reflection surface 62 is directly exposed to the outside air, so that contaminants easily adhere to reflective surface 62. In particular, when waveguide 61 is connected to light-emitting/receiving device 50 using an optical adhesive containing a refractive index matching material, as shown in FIG. 6, adhesive 54 tends to reach around to reflection surface 62 of waveguide 61 in addition to the space between waveguide 61 and light-emitting/receiving device 50 (adhesion re-ion). As described above, when reflection surface 62 is exposed at an end of optical waveguide 61, contaminants such as an adhesive tend to adhere to reflection surface 62, causing optical loss when propagated light is reflected at the reflection surface.

In contrast, in polymer optical waveguide 11 according to the first exemplary embodiment of the present invention, protruding portion 26 inhibits an adhesive from reaching the reflection surface, whereby adhesion of the adhesive to reflection surface 22 is prevented. The connection of optical waveguide 11 to light-emitting/receiving device may be performed by positioning (aligning) optical waveguide 11 and the light-emitting/receiving device such that light is reflected at reflection surface 22 of optical waveguide 11 to change the direction of propagation thereof and then adhering, with an optical adhesive, the light-emitting/receiving device to the lower surface of optical waveguide 11. The difference between the refractive index of the optical adhesive after curing and the refractive index of each of waveguide core 12 and the cladding portions (cladding portions 14A and 14B) is preferably small; specifically, the difference is preferably 0.3 or less, and more preferably 0.1 or less. An optical adhesive having such optical properties may be selected from a wide range of resins, including thermosetting resins and photocurable resins. In consideration of convenience and the degree of alignment deviation caused by heat, the optical adhesive is preferably a UV-curable resin.

Further, in polymer optical waveguide 11 according to the present exemplary embodiment, groove 20 is open at both ends in length direction "c" thereof. However, unless width X2 of cladding portions (side cladding) located at either side of waveguide 11 in width direction "c" of waveguide 11, which is a distance between the core and a side surface of the waveguide, is very short, adhesive is inhibited from reaching core portion 12a of reflection surface 22 even when the adhesive reaches around into groove 20 from an open end of groove 20. Width X2 of each side cladding may vary depending on, for example, the viscosity of the adhesive, and is preferably about 100 µm or more, more preferably about 250 µm or more, and still more preferably about 1,000 µm or more.

Second Exemplary Embodiment

Figure 3A:
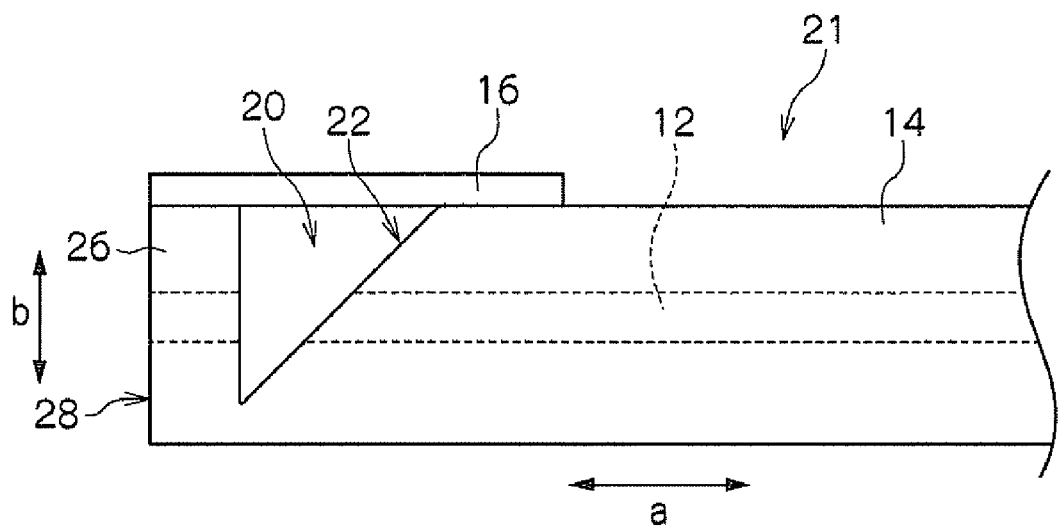
FIG. 3A is a schematic side view illustrating a structure of a polymer optical waveguide according to a second exemplary embodiment.
Figure 3B:
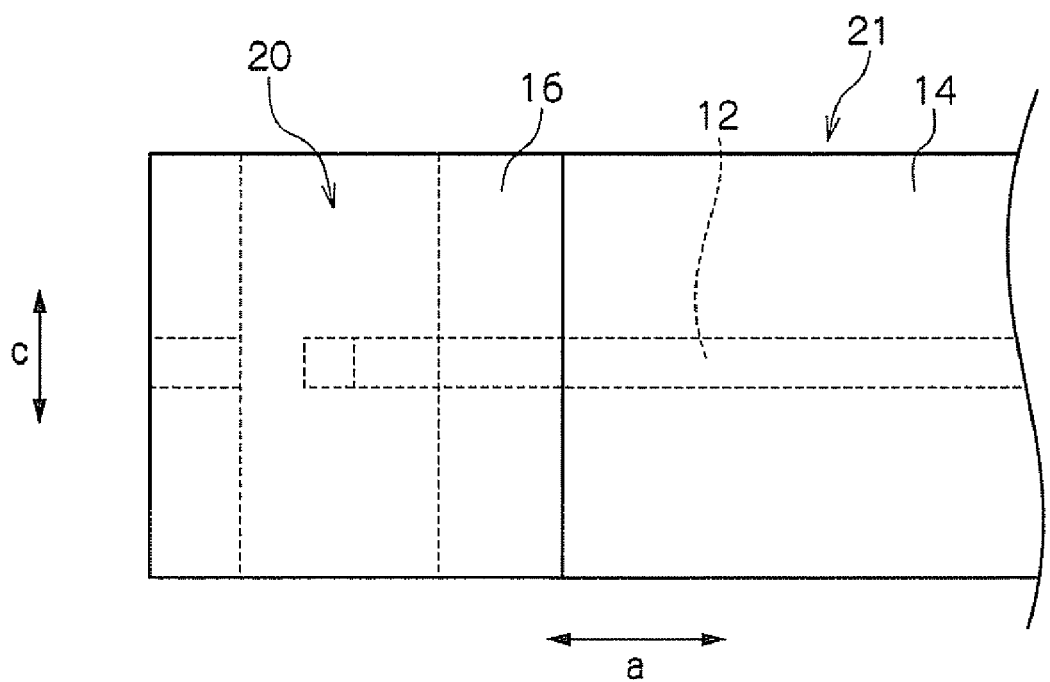
FIG. 3B is a top view of the structure.

FIG. 3A is a side view schematically illustrating the structure of a polymer optical waveguide according to a second exemplary embodiment, and FIG. 3B is a plan view thereof.

In polymer optical waveguide 21 according to the exemplary embodiment, flat plate 16 is provided as a covering member that covers the upper side of groove 20. The configuration of polymer optical waveguide 21 is the same as polymer optical waveguide 11 according to the first exemplary embodiment, except that flat plate 16 is provided. Protruding portion 26 is located at an outer side of groove 20 with respect to a central portion of the waveguide in a length direction thereof (i.e., at a side of groove 20 nearer to the end in a length direction of the waveguide). Therefore, in polymer optical waveguide 21, protruding portion 26 inhibits entry of contaminants, and flat plate 16 also suppresses entry of contaminants from above groove 20 and adhesion thereof to reflection surface 22. Consequently, reduction of reflection efficiency is reliably suppressed.

An example of a method of producing polymer optical waveguide 21 according to the second exemplary embodiment is described below.

In the same manner as in the production of polymer optical waveguide 11 according to the first exemplary embodiment, polymer film 10 having core 12 and cladding 14 is prepared, and groove 20 having 45°-inclined surface 22 is formed near an end of polymer film 10. Thereafter, the upper side of groove 20 is covered by flat plate 16.

Flat plate 16 disposed at an upper side of the groove may be provided through the following steps (a) to (c):

(a) a step of preparing flat plate 16;
(b) a step of adhering, with an adhesive, flat plate 16 to a top surface of the waveguide so as to cover an upper side of groove 20; and
(c) a step of curing the adhesive.

(a) Step of Preparing Flat Plate

When a UV-curable resin is used to adhere flat plate 16, it is preferable to select a flat plate formed of a material that is transparent in the UV wavelength range as flat plate 16. When flat plate 16 is transparent, positioning of a light-emitting/receiving point of a light-emitting/receiving device and waveguide core 12 is easy at the time of attaching the light-emitting/receiving device to waveguide 21.

In recent years, when a polymer optical waveguide is applied to a mobile equipments or the like, there is a request for the polymer optical waveguide to have very high flexibility (giving a bend radius of about 2 mm)). If polymer optical waveguide 21 has such high flexibility, when optical waveguide 21 is connected to a light-emitting/receiving device, the connection may be difficult due to the high flexibility of the waveguide. Therefore, when flat plate 16 disposed at an upper side of the groove is formed by a resin film having a higher hardness than that of the waveguide main body constituted by core 12 and cladding 14, picking-up and conveyance of the waveguide is easy, which is preferable.

The viscosity and coating amount of the adhesive (not shown in the drawings) to be provided between flat plate 16 and cladding 14 may be optimized so as to provide sufficient adhesion force after curing, so as to prevent the adhesive from flowing onto 45°-inclined reflection surface 22, and so as to reduce reflection loss of the propagated light. An uncured adhesive thin layer may be provided at one side of flat plate 16 in advance, in order to secure sufficient adhesion force and in order to inhibit the adhesive from flowing onto the reflection surface.

The method of forming an uncured thin adhesive layer on flat plate 16 may be selected from known methods, such as a dipping method or a spin coating method. The spin coating method is preferable in consideration of convenience, ease in controlling the thickness of the formed adhesive layer, and uniformity of the thickness of the formed adhesive layer.

The thickness of the uncured adhesive layer on flat plate 16 is preferably 20 µm or less, and more preferably 10 µm or less, from the viewpoint of inhibiting the adhesive forming the uncured adhesive layer from flowing onto reflection surface 22 when flat plate 16 is adhered to a portion of the optical waveguide adjacent to the groove.

It is also effective to subject the uncured adhesive provided on flat plate 16 to a semi-curing treatment, as another method for controlling the thickness of the uncured adhesive layer for the purpose of preventing the adhesive forming the uncured adhesive layer from flowing onto reflection surface 22. The term "semi-cured" as used herein refers to a state in which the adhesive is incompletely cured and still has a certain degree of adhesion force. The term "semi-curing" as used herein refers to partially curing the adhesive such that the adhesive becomes semi-cured. For example when the uncured adhesive layer is formed of a UV-curable resin, the method of performing a semi-curing treatment may be a method in which a curing treatment using UV rays is conducted with at least one of the time and UV intensity of the curing treatment controlled so as to stop the irradiation before completely curing the adhesive.

When the uncured adhesive layer is formed of a thermosetting resin, a heating treatment is conducted with at least one of the heating time or heating temperature controlled so as to stop the heating treatment before completely curing the adhesive. When the resin for forming the uncured adhesive layer contains a solvent, it is also possible to semi-cure the adhesive by evaporating the solvent so as to increase the degree of viscosity of the adhesive. The evaporation of the solvent may be achieved by, for example, leaving the uncured adhesive layer in the atmospheric air or in a reduced-pressure environment or by heating the uncured adhesive layer. Another method for semi-curing the adhesive that is applicable when the uncured adhesive layer is formed of a radical-curable polymer material includes performing a curing treatment in an atmosphere containing oxygen so as to semi-cure the adhesive due to oxygen inhibition.

(b) Step of Adhering Flat Plate to Top Surface of Waveguide with Adhesive so as to Cover Upper Side of Groove After an uncured adhesive thin layer is formed on flat plate 16, flat plate 16 is adhered, with the uncured adhesive layer, to the optical waveguide main body so as to cover an upper side of groove 20. Flat plate 16, which covers the upper side of groove 20, may be adhered to an entire area of a surface having groove 20 extending along width direction thereof of the optical waveguide, in consideration of the ease of operation.

(c) Step of Curing Adhesive

After flat plate 16 is adhered to the optical waveguide, the uncured adhesive layer is completely cured by performing a treatment suitable for the properties of the adhesive layer. For example, when the uncured adhesive layer is formed of a UV-curable resin, the uncured adhesive layer may be completely cured by irradiation with UV, rays. When flat plate 16 is transparent to the UV rays, the UV rays may be irradiated from the flat plate 16 side. When flat plate 16 is not transparent to the UV rays, the UV rays may be irradiated from the lower surface side of the optical waveguide toward flat plate 16.

As a result of the curing of the adhesive layer, flat plate 16 is fixed to the optical waveguide main body (polymer film), so that polymer optical waveguide 21 according to the second exemplary embodiment is obtained which has such a configuration as shown in FIGS. 3A and 3B.

Figure 4A:
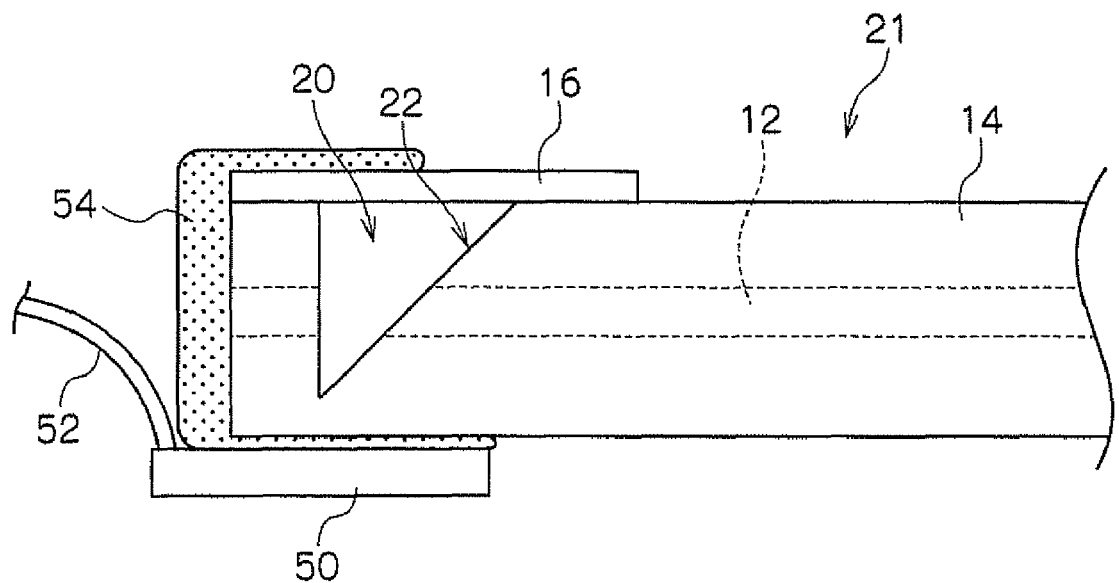
FIG. 4A is a schematic side view illustrating a state in which a polymer optical waveguide according to the second exemplary embodiment is connected to a light-emitting/receiving device.
Figure 4B:
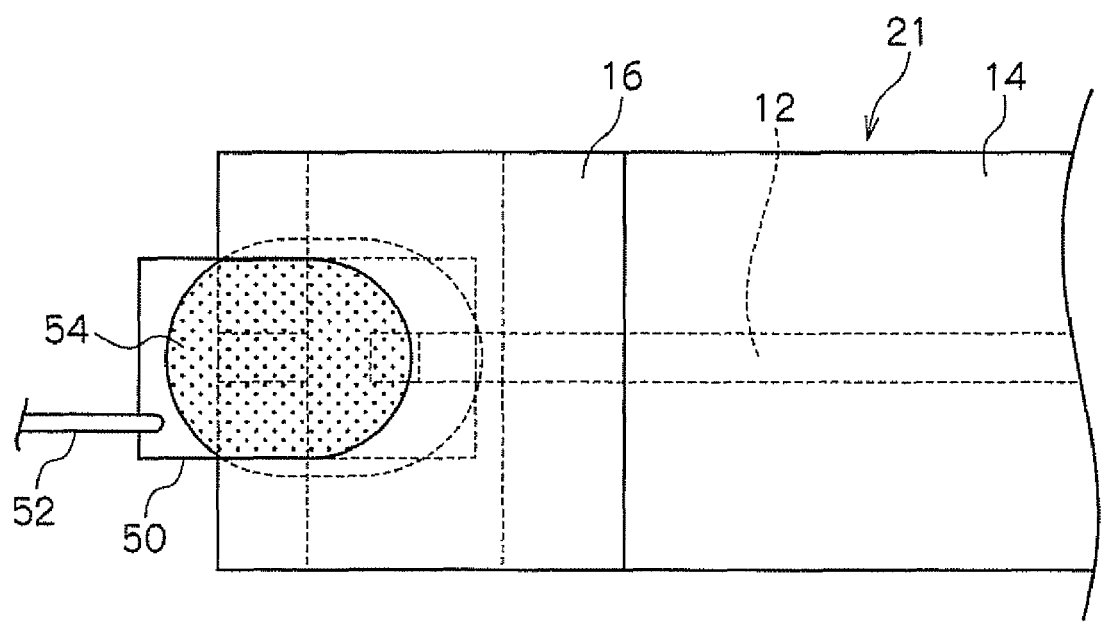
FIG. 4B is a top view thereof.

FIGS. 4A and 4B show a state in which optical waveguide 21 according to the second exemplary embodiment is connected, with an optical adhesive, to light-emitting/receiving device 50. Connecting cord 52 is connected to light-emitting/receiving device 50. In this optical waveguide 21, covering member (flat plate) 16 disposed above groove 20, as well as protruding portion 26, inhibits an adhesive and the like used for adhesion to light-emitting/receiving, device 50 from reaching reflection surface 22, so that effects greater than those of optical waveguide 11 of the first exemplary embodiment are produced with respect to prevention of reflection loss.

Third Exemplary Embodiment

Figure 5:
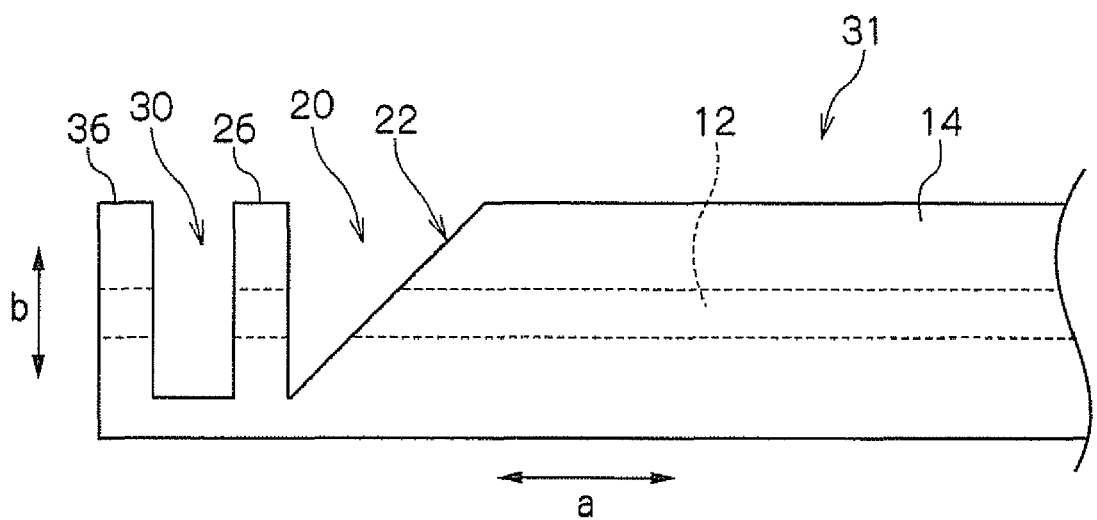
FIG. 5 is a side view schematically illustrating a polymer optical waveguide according to a third exemplary embodiment.

FIG. 5 is a side view schematically illustrating a polymer optical waveguide according to a third exemplary embodiment. In polymer optical waveguide 31 according to the present exemplary embodiment, first groove 20 having reflection surface 22, and second groove 30 located at a side of groove 20 that is nearer to the end surface of polymer optical waveguide 31, are formed. Reflection surface 22 is inclined at an angle of 45° with respect to light propagation direction "a". Since polymer optical waveguide 31 has second groove 30 at a position that is nearer to the end surface of polymer optical waveguide 31 than first groove 20 is, adhesion of contaminants, such as an adhesive, to reflection surface 22 provided at first groove 20 is suppressed more efficiently; for example, when optical waveguide 31 and a light-emitting/receiving device are adhered to each other with the adhesive, a part of excessive adhesive is collected in second groove 30. Second groove 30, which is provided in order to prevent the entry of contaminants, should be positioned such that second groove 30 is nearer to the end surface of polymer optical waveguide 31 than first groove 20 having 45°-inclined reflection surface 22. However, the depth and width of second groove 30 are not particularly limited as long, as second groove 30 has a volume suitable for collecting contaminants such as the adhesive. The shape of second groove 30 is not particularly limited either. There may be plural second grooves 30, and the number of second groove(s) 30 is not particularly limited.

Formation of Outer Shape of Optical Waveguide

In any exemplary embodiment, the outer shape of the optical waveguide may be processed as necessary. The outer shape may be processed with a dicing saw having a blade rotating at high speed, in accordance with, for example, the light-emitting/receiving device to be connected to the optical waveguide and the space for positioning the optical waveguide.

In polymer optical waveguide 21 according to the second exemplary embodiment for example, together with the outer shape processing of optical waveguide 21, flat plate 16 may be cut with a dicing saw to a depth that is a part of the thickness of flat plate 16 so as to provide an alignment mark for the connection of optical waveguide 21 and light-emitting/receiving device 50.

The foregoing description of the exemplary embodiments of the present invention has been provided for the purposes of illustration and description. It is not intended to be exhaustive or to limit the invention to the precise forms disclosed. Obviously, many modifications and variations will be apparent to persons skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLES

The present invention is described more specifically below by reference to examples. However, the examples should not be construed as limiting the invention.

Example 1

A polymer optical waveguide in which both end surfaces have an angle of 90° with respect to the longitudinal axis of the waveguide is prepared according to a method of producing a polymer optical waveguide disclosed in JP-A No. 2004-226941, in which a silicone rubber mold is used. The polymer optical waveguide has a rectangular parallelepiped shape.

Preparation of Master Plate

A thick-layer resist was applied on a Si substrate by a spin coating method, pre-baked at 80° C., exposed to light through a photomask, and developed to form a plate having a protruding portion for forming a core. The protruding portion has a width of 50 µm and a height of 50 µm, which corresponds to the shape of the core. The plate is post-baked at 120° C. to provide a master plate.

Preparation of Mold

Then, a thermosetting dimethylsiloxane resin (SYL-GARD184 manufactured by Dow Corning Asia Ltd.) is applied to the master plate, defoamed under vacuum for 10 minutes, and heated at 120° C. for 30 minutes to harden the resin. Then, the master plate is peeled off, thereby providing a mold having a recess portion for forming a core. A hole having a diameter of 3 mm is formed at an end portion of the recess portion in the longitudinal direction, and another hole having a diameter of 3 mm is also formed at the other end portion of the recess portion in the longitudinal direction. One of the two holes is used as a filling port, and the other of the two holes is used as a suction port.

Preparation of Waveguide Core

Thereafter, a film substrate having a thickness of 188 µm (ARTON film manufactured by JSR Corporation, having a refractive index of 1.51) as a substrate that serves as a lower cladding (substrate for lower cladding) is prepared, and the film substrate is brought into tight contact with the mold so as to cover the recess portion for forming a core. Then, a UV-curable resin having a viscosity of 800 mPa·s (epoxy resin, which will show a refractive index of 1.54 after curing) is supplied from the filling port formed at the mold, and suction through the suction port is conducted by using a suction pump. As a result, the UV-curable resin filled the recess portion for forming a core, except for unfilled portions at the filling and suction ports. Then, the resin is cured by irradiation of UV rays at an intensity of 50 mW/cm$^2$ through the mold (formed of a dimethylsiloxane resin) for 10 minutes. Thereafter, the mold is peeled off, so that a waveguide core is formed on the substrate for lower cladding.

Preparation of Upper Cladding

A UV-curable resin for cladding (acrylic resin having a viscosity at 25° C. of 360 mPa·s, which will show a refractive index of 1.51 after curing) is applied dropwise from above the waveguide core formed on the substrate for lower cladding. Then, a substrate for upper cladding (ARTON film manufactured by JSR Corporation having a refractive index of 1.51) is adhered thereto. Then, the curable resin for cladding is cured by irradiation of UV rays at an intensity of 50 mW/cm$^2$ for 10 minutes, whereby upper cladding is formed.

Outer Shape Formation

A dicing saw having a rectangular-shaped diamond blade at the blade edge is used to shape the optical waveguide, whereby an optical waveguide having planar surfaces is obtained. In other words, the optical waveguide has a rectangular parallelepiped shape.

Thereafter, groove 20 having a 45°-inclined reflection surface 22 as shown in FIGS. 1A and 1B is formed at the shaped optical waveguide. Specifically, in the formation of groove 20, blade 40 with a blade edge having an angle of 45° as shown in FIG. 2 is used to perform a half-cut, in which the height of the edge of blade 40 at the cutting is set to 100 μm above the lower surface of the optical waveguide, and distance X1 from the end surface is set to 100 μm. As a result, groove 20 having a 45°-inclined reflection surface is formed, together with the formation of protruding portion 26 for inhibiting an adhesive from reaching the reflection surface.

Connection to Light-Emitting Device

The light-emitting point of a light-emitting device (VCSEL manufactured by Fuji Xerox Co., Ltd., emission wavelength: 850 nm) mounted on a package and the waveguide prepared above are positioned such that the light emitted from the light-emitting device enters the waveguide and is reflected at reflection surface 22 to change its propagation direction, and the light-emitting device and the waveguide are adhered to each other with a UV-curable resin (acrylic resin, which will show a refractive index of 1.51 after curing).

When an end portion of the waveguide in the optical module prepared above, at which the waveguide and the light-emitting device are connected, is observed under a microscope, it is found that the adhesive has not entered groove 20 although the adhesive has reached a central portion of protruding portion 26, and adhesion of contaminants to reflection surface 22 is not found. The mirror loss of the optical waveguide is found to be 0.5 dB.

Comparative Example 1

Using a procedure similar to that adopted in Example 1, waveguide 61 as shown in FIG. 6 is prepared, in which 45°-inclined reflection surface 62 is formed at an end of the waveguide but a protruding portion for inhibiting the adhesive from reaching reflection surface 62 is not provided. The obtained waveguide and a light-emitting device are so positioned to cause optical-path-deflection at the reflection surface, and are connected to each other.

In this optical module, it is found that the adhesive has got around to the reflection surface of the waveguide, and its mirror loss is found to be 13 dB.

Example 2

Preparation of Optical Waveguide

A polymer optical waveguide in which groove 20 having a 45°-inclined reflection surface and protruding portion 26 for inhibiting an adhesive from reaching the reflection surface are formed is prepared in the same manner as in Example 1.

Formation of Uncured Thin Adhesive Layer on Film

In order to prepare a covering member for covering an upper side of the groove, an acrylic UV-curable resin (UV-curable radical-type polymer material having a viscosity of 360 mPa·s, which will show a refractive index of 1.51 after curing) is applied dropwise to a film having a thickness of 188 μm (ARTON film manufactured by JSR Corporation, having a refractive index of 1.51), and an uncured thin layer having a thickness of 8 μm is formed by a spin coating method.

Covering Upper Side of Waveguide Groove

The above film is attached to a surface of the optical waveguide at which the groove of the waveguide extends in the width direction with the uncured adhesive layer between the film and the waveguide. Then, UV rays are irradiated from above the film, so as to cure the uncured thin layer.

Forming Outer Shape of Waveguide

The optical waveguide is shaped using a dicing saw having a rectangular blade at the edge. In other words, the optical waveguide has a rectangular parallelepiped shape. At the time of cutting, width X1 of protruding portion 26 is set to 50 μm.

Connection to Light-Emitting Device

The light-emitting point of a light-emitting device (VCSEL manufactured by Fuji Xerox Co., Ltd., emission wavelength; 850 nm) mounted on a package and the waveguide prepared above are positioned such that the light emitted from the light-emitting device enters the waveguide and is reflected at reflection surface 22 to change its propagation direction, and the light-emitting device and the waveguide are adhered to each other with a UV-curable resin (for example, an acrylic resin, which will show a refractive index of 1.51 after curing).

When the 45°-inclined reflection surface in the optical module prepared above is observed under a microscope, adhesion of contaminants is not found, but it is found that the adhesive has got around to a part of each side surface of the protruding portion disposed at an end portion of the waveguide and to a part of the upper covering (covering member). The mirror loss of the optical waveguide is found to be 0.5 dB.

The present invention is not limited to the exemplary embodiments and examples described above, and modifications may be made as desired. For example, groove 20 having a 45°-inclined surface may be provided near each end (each of the two ends in the longitudinal direction) of the optical waveguide.

The number of the core portions in the optical waveguide and the spacing between the core portions is not limited, and may be appropriately set in accordance with the request.

What is claimed is:

1. A polymer optical waveguide comprising:
   a core;
   a cladding enclosing the core and extending along a direction of light propagation,
   the polymer optical waveguide having a substantially rectangular parallelepiped shape, and
   the polymer optical waveguide further having, at least at a position near one end thereof in a longitudinal direction, a groove that has a surface vertical with respect to the light propagation direction, and a surface inclined at an angle of 45° with respect to the light propagation direction which reflects light propagating through the core so as to change the light propagation direction by 90°, a part of the cladding being left at a bottom of the groove;

a protruding portion positioned between an end surface at the one end of the optical waveguide and the vertical surface of the groove, the protruding portion being disposed along a length direction of the groove so as to oppose the surface inclined at an angle of 45°; and a width of the protruding portion in the length direction of the groove being more than about 50 µm but not more than about 1,000 µm, wherein the groove is not part of the protruding portion, and the protruding portion has an end surface that is common with the surface of the groove that is vertical with respect to the light propagation direction.

2. The polymer optical waveguide according to claim 1, wherein a thickness between a lowest point of the groove and a lower surface of the optical waveguide is about 5 µm or more.

3. The polymer optical waveguide according to claim 1, wherein the width of the protruding portion in the length direction of the groove is more than about 50 µm but not more than about 500 82 m.

4. The polymer optical waveguide according to claim 1, wherein a thickness between a lowest point of the groove and the bottom of the core is about 5 µm or more.

5. The polymer optical waveguide according to claim 1, further comprising a covering member that covers an upper side of the groove.

6. The polymer optical waveguide according to claim 5, wherein the covering member is formed of a transparent material.

7. The polymer optical waveguide according to claim 1, wherein the polymer optical waveguide further comprises a second groove at a position that is nearer to the end surface at the one end of the optical waveguide than the groove having the inclined surface.

8. A method of producing a polymer optical waveguide, comprising:

preparing a polymer film having a core and a cladding enclosing the core and extending along a direction of light propagation; and cutting the polymer film in a thickness direction thereof using a blade having a surface inclined at an angle of 45° at a blade edge thereof so as to form i) a groove having a surface vertical with respect to the light propagation direction, and a surface inclined at an angle of 45° with respect to the direction of light propagation which reflects light propagating through the core to change the direction of light propagation by 90°, and ii) a protruding portion positioned between an end surface at one end of the optical waveguide and the vertical surface of the groove, the protruding portion being disposed along a length direction of the groove so as to oppose the surface inclined at an angle of 45°, a part of the cladding being left at a bottom of the groove, wherein a width of the protruding portion in the length direction of the groove is more than about 50 µm but not more than about 1,000 µm, wherein the groove is not part of the protruding portion, and the protruding portion has an end surface that is common with the surface of the groove that is vertical with respect to the light propagation direction.

9. The method according to claim 8, further comprising:

providing an uncured adhesive layer on one surface of a flat plate;

attaching the flat plate onto the polymer film with the uncured adhesive layer therebetween such that the flat plate covers an upper side of the groove formed at the polymer film; and curing the uncured adhesive layer so as to adhere the flat plate to the polymer film.

10. The method according to claim 8, wherein the groove having the inclined surface is formed near the end surface at the one end of the optical waveguide in a longitudinal direction thereof, and the method further comprises forming a second groove at a position nearer to the end surface at the one end of the optical waveguide than the groove having the inclined surface.

11. The method according to claim 8, wherein the width of the protruding portion in the length direction of the groove is more than about 50 µm but not more than about 500 µm.

* * * * *